(12) United States Patent
Abe (10) Patent No.: US 11,378,788 B2
(45) Date of Patent: Jul. 5, 2022

(54) ZOOM LENS SYSTEM AND IMAGING APPARATUS

(71) Applicant: NITTOH INC., Suwa (JP)

(72) Inventor: Tetsuya Abe, Sapporo (JP)

(73) Assignee: NITTOH INC., Suwa (JP)

( * ) Notice: Subject to any disclaimer, the term of this patent is extended or adjusted under 35 U.S.C. 154(b) by 0 days.

(21) Appl. No.: 15/733,907

(22) PCT Filed: Jun. 4, 2019

(86) PCT No.: PCT/JP2019/022147
§ 371 (c)(1),
(2) Date: Dec. 1, 2020

(87) PCT Pub. No.: WO2019/235471
PCT Pub. Date: Dec. 12, 2019

(65) Prior Publication Data
US 2021/0223523 A1    Jul. 22, 2021

(30) Foreign Application Priority Data

Jun. 5, 2018  (JP) .............................. JP2018-107960

(51) Int. Cl.
*G02B 15/14*    (2006.01)
(52) U.S. Cl.
CPC ............................ *G02B 15/143507* (2019.08)
(58) Field of Classification Search
CPC ............................................. G02B 15/143507
(Continued)

(56) References Cited

U.S. PATENT DOCUMENTS 6,124,984 A * 9/2000 Shibayama .... G02B 15/143507
  359/689
6,968,128 B2 * 11/2005 Itoh ...................... G02B 15/177
  396/79

(Continued)

FOREIGN PATENT DOCUMENTS

JP    2003-215451 A    7/2003
JP    2008-122556 A    5/2008

(Continued)

OTHER PUBLICATIONS

PCT, Japan Patent Office (ISA/JP), International Search Report (with English translation), International Application No. PCT/JP2019/022147, 4 pages (dated Aug. 13, 2019).

(Continued)

*Primary Examiner* — Darryl J Collins
(74) *Attorney, Agent, or Firm* — Thompson Hine LLP (57) ABSTRACT

A zoom lens system (10) for imaging, includes, in order from an object side (11); a first lens group (G1) with negative refractive power that moves at the time of zooming; a second lens group (G2) with a positive refractive power that moves at the time of zooming, the second lens group including an aperture stop (St); a third lens group (G3) with a positive refractive power, the position of which is fixed relative to the image plane. The second lens group includes: a first sub-lens group (S1) with a positive refractive power arranged on the object side and having the aperture stop; and a second sub-lens group (S2) with a negative refractive power arranged on the image plane side and configured to move independently of the first sub-lens group at the time of focusing.

15 Claims, 8 Drawing Sheets

(58) Field of Classification Search
USPC .......................................................... 359/689
See application file for complete search history.

(56) References Cited

U.S. PATENT DOCUMENTS

| | | | |
|---|---|---|---|
| 7,907,351 B2* | 3/2011 | Tomioka | G02B 15/177 |
| | | | 359/691 |
| 2008/0019020 A1* | 1/2008 | Kawakami | G02B 15/177 |
| | | | 359/689 |
| 2012/0050882 A1* | 3/2012 | Arai | G02B 27/644 |
| | | | 359/680 |
| 2014/0375870 A1 | 12/2014 | Kawamura | |
| 2015/0237266 A1 | 8/2015 | Ichikawa | |
| 2018/0113286 A1* | 4/2018 | Minefuji | G02B 15/143507 |

FOREIGN PATENT DOCUMENTS

| | | |
|---|---|---|
| JP | 2010-044226 A | 2/2010 |
| JP | 2015-004880 A | 1/2015 |
| JP | 2016-014807 A | 1/2016 |
| WO | 2014/087855 A1 | 6/2014 |

OTHER PUBLICATIONS

PCT, English Translation of International Search Report and Written Opinion, International Application No. PCT/JP2019/022147; dated Dec. 8, 2020, 6 pages.

* cited by examiner

| LENSE SURFACE NUMBER (Si) | RADIUS OF CURVATURE (Ri) mm | DISTANCE (di) mm | REFRACTIVE INDEX (nd) | ABBE NUMBER (νd) | EFFECTIVE DIAMETER (Di) mm | LENS | | | FOCAL LENGTH mm | | |
|---|---|---|---|---|---|---|---|---|---|---|---|
| 1 | 76.60300 | 1.20000 | 1.67790 | 55.34 | 57.80 | L1 | | | G1 −65.45 | | |
| 2 | 33.94700 | 8.59204 | | | 48.70 | | | | | | |
| 3 | 151.27800 | 1.20000 | 1.62041 | 60.29 | 48.50 | L2 | | | | | |
| 4 | 41.74100 | 7.78879 | | | 45.00 | | | | | | |
| 5 | −268.09400 | 1.20000 | 1.51633 | 64.14 | 44.90 | L3 | | | | | |
| 6 | 62.76800 | 3.04021 | | | 44.40 | | | | | | |
| 7 | 54.22700 | 7.32523 | 1.83400 | 37.16 | 45.50 | L4 | | | | | |
| 8 | 1265.00700 | 37.65101 | | | 44.80 | | | | | | |
| 9 | 34.25200 | 12.67752 | 1.51633 | 64.06 | 26.50 | L5 | | | S1f 70.46 | S1 35.55 | G2 41.48 |
| 10 | −55.71800 | 5.20956 | | | 25.30 | | | | | | |
| 11 | −56.42000 | 1.20000 | 1.74400 | 44.79 | 23.30 | L6 | B1 | | | | |
| 12 | 26.23100 | 6.81858 | 1.49700 | 81.54 | 23.20 | L7 | | | | | |
| 13 | −44.66300 | 0.15000 | | | 23.60 | | | | | | |
| 14 | Flat | 0.15000 | | | 18.37 | St | | | | | |
| 15 | 31.50300 | 6.37331 | 1.60300 | 65.44 | 24.70 | L8 | | | S1b 46.70 | | |
| 16 | −57.11300 | 0.15000 | | | 24.60 | | | | | | |
| 17 | 9097.72100 | 2.00000 | 1.54814 | 45.78 | 24.00 | L9 | | | | | |
| 18 | 21.99300 | 2.13601 | | | 22.80 | | | | | | |
| 19 | 51.11100 | 6.91478 | 1.51633 | 64.14 | 22.90 | L10 | B2 | | | | |
| 20 | −22.64400 | 1.20000 | 1.79952 | 42.22 | 22.90 | L11 | | | | | |
| 21 | −40.54200 | 1.20000 | | | 23.50 | | | | | | |
| 22 | 397.64200 | 3.73869 | 1.78472 | 25.68 | 23.00 | L12 | | | LU1 57.95 | S2 −29.63 | |
| 23 | −51.66800 | 1.14987 | | | 22.80 | | | | | | |
| 24 | −68.10200 | 1.20000 | 1.71300 | 53.87 | 22.20 | L13 | | | LU2 −18.33 | | |
| 25 | 29.37800 | 7.92225 | | | 22.00 | | | | | | |
| 26 | −24.16300 | 2.55888 | 1.83220 | 40.10 | 23.40 | L14 | | | | | |
| 27 | −46.68600 | 3.25760 | | | 27.80 | | | | | | |
| 28 | 385.18600 | 5.86658 | 1.71300 | 53.87 | 49.50 | L15 | | | G3 131.82 | | |
| 29 | −124.25300 | 15.22911 | | | 50.30 | | | | | | |
| 30 | Flat | 1.80000 | 1.53740 | 61.71 | 56.00 | FILTER | | | | | |
| 31 | Flat | 0.10000 | | | 56.00 | | | | | | |
| 32 | Flat | | | | | IMG | | | | | |

Fig. 3

| SURFACE NO. | K | A | B | C | D |
|---|---|---|---|---|---|
| S9 | -2.7930 | 3.7648E-06 | -4.3489E-09 | 0.0000E+00 | 0.0000E+00 |
| S10 | 0.0000 | 5.8609E-06 | -2.0118E-09 | 0.0000E+00 | 0.0000E+00 |
| S26 | 1.8436 | -2.1849E-05 | 2.0456E-08 | 0.0000E+00 | 0.0000E+00 |
| S27 | 0.0000 | -2.7426E-05 | 2.1610E-08 | -5.9043E-11 | 0.0000E+00 |

Fig. 4

| ZOOM POSITION | WIDE | MIDDLE | TELE |
|---|---|---|---|
| FOCAL LENGTH | 35.900 | 51.058 | 73.195 |
| F NO. | 3.500 | 4.000 | 4.500 |
| ANGLE OF VIEW | 38.51° | 28.32° | 20.45° |
| d8 | 37.651 | 18.187 | 4.280 |
| d27 | 3.258 | 14.401 | 30.758 |
| Φst | 18.37 | 20.22 | 23.5 |

Fig. 5

| IMAGE PICKUP DISTANCE | | INFINITY | 2.0m | 0.65m |
|---|---|---|---|---|
| ZOOM POSITION | DISTANCE | | | |
| WIDE | d21 | 1.200 | 1.4620 | 2.147 |
| MIDDLE | d21 | 1.200 | 1.5651 | 2.501 |
| TELE | d21 | 1.200 | 1.6646 | 2.895 |

| LENSE SURFACE NUMBER (Si) | RADIUS OF CURVATURE (Ri) mm | DISTANCE (di) mm | REFRACTIVE INDEX (nd) | ABBE NUMBER ($\nu$ d) | EFFECTIVE DIAMETER (Di) mm | LENS | | | FOCAL LENGTH mm | | |
|---|---|---|---|---|---|---|---|---|---|---|---|
| 1 | 88.20600 | 1.20000 | 1.67790 | 55.34 | 57.80 | L1 | | | G1 −61.35 | | |
| 2 | 34.08300 | 7.49000 | | | 48.54 | | | | | | |
| 3 | 101.76900 | 1.20000 | 1.62041 | 60.29 | 48.36 | L2 | | | | | |
| 4 | 38.19500 | 9.80000 | | | 44.79 | | | | | | |
| 5 | −230.84000 | 1.20000 | 1.51633 | 64.14 | 44.50 | L3 | | | | | |
| 6 | 58.21100 | 2.03000 | | | 44.09 | | | | | | |
| 7 | 49.83500 | 7.53000 | 1.83400 | 37.16 | 45.20 | L4 | | | | | |
| 8 | 618.58600 | 36.56795 | | | 44.80 | | | | | | |
| 9 | 32.54500 | 10.38000 | 1.51633 | 64.06 | 26.50 | L5 | | | S1f 69.07 | S1 40.20 | G2 40.94 |
| 10 | −97.92000 | 7.19000 | | | 25.85 | | | | | | |
| 11 | −197.56300 | 1.20000 | 1.74400 | 44.79 | 23.56 | L6 | B1 | | | | |
| 12 | 21.15400 | 6.97000 | 1.49700 | 81.54 | 23.06 | L7 | | | | | |
| 13 | −65.11000 | 0.15000 | | | 23.33 | | | | | | |
| 14 | Flat | 0.15000 | | | 18.37 | St | | | | | |
| 15 | 29.82200 | 6.85000 | 1.60300 | 65.44 | 24.70 | L8 | | | S1b 65.02 | | |
| 16 | −43.49400 | 0.35000 | | | 24.30 | | | | | | |
| 17 | −93.53200 | 2.00000 | 1.54814 | 45.78 | 23.67 | L9 | | | | | |
| 18 | 22.56900 | 2.34000 | | | 22.49 | | | | | | |
| 19 | 70.60200 | 6.63000 | 1.51633 | 64.14 | 22.57 | L10 | B2 | | | | |
| 20 | −21.79900 | 1.20000 | 1.79952 | 42.22 | 22.81 | L11 | | | | | |
| 21 | −49.02600 | 1.54668 | | | 23.62 | | | | | | |
| 22 | 243.71300 | 4.15000 | 1.78472 | 25.68 | 24.22 | L12 | | | LU1 51.36 | S2 −49.40 | |
| 23 | −48.45400 | 1.91000 | | | 24.36 | | | | | | |
| 24 | −81.55200 | 1.20000 | 1.71300 | 53.87 | 23.77 | L13 | | | LU2 −23.04 | | |
| 25 | 41.46800 | 5.93000 | | | 24.07 | | | | | | |
| 26 | −25.33400 | 2.78000 | 1.83220 | 40.10 | 24.27 | L14 | | | | | |
| 27 | −49.87600 | 5.16795 | | | 27.80 | | | | | | |
| 28 | Flat | 4.34000 | 1.71300 | 53.87 | 47.77 | L15 | | | G3 226.7 | | |
| 29 | −162.34900 | 14.73113 | | | 48.68 | | | | | | |
| 30 | Flat | 1.80000 | 1.53740 | 61.71 | 55.45 | FILTER | | | | | |
| 31 | Flat | 0.14482 | | | 56.00 | | | | | | |
| 32 | Flat | −0.01660 | | | | IMG | | | | | |

Fig. 9

| SURFACE NO. | K | A | B | C | D |
|---|---|---|---|---|---|
| S9 | -2.7199 | 4.9723E-06 | -4.6639E-09 | 0.0000E+00 | 0.0000E+00 |
| S10 | 0.0000 | 3.6470E-06 | 1.7875E-09 | 0.0000E+00 | 0.0000E+00 |
| S26 | 1.6883 | -1.7009E-05 | 1.9719E-08 | 0.0000E+00 | 0.0000E+00 |
| S27 | 0.0000 | -2.1102E-05 | 1.9046E-08 | -3.9420E-11 | 0.0000E+00 |

Fig. 10

| ZOOM POSITION | WIDE | MIDDLE | TELE |
|---|---|---|---|
| FOCAL LENGTH | 35.906 | 50.543 | 73.110 |
| F NO. | 3.500 | 4.000 | 4.500 |
| ANGLE OF VIEW | 39.40° | 29.06° | 20.72° |
| d8 | 36.568 | 18.313 | 3.951 |
| d21 | 1.547 | 1.202 | 1.210 |
| d27 | 5.168 | 16.312 | 32.668 |
| Φst | 18.42 | 20.11 | 23.40 |

Fig. 11

| IMAGE PICKUP DISTANCE | | INFINITY | 2.0m | 0.65m |
|---|---|---|---|---|
| ZOOM POSITION | DISTANCE | | | |
| WIDE | d21 | 1.547 | 2.1102 | 3.620 |
| MIDDLE | d21 | 1.202 | 1.9443 | 3.921 |
| TELE | d21 | 1.210 | 2.1954 | 4.825 |

Fig. 12

ZOOM LENS SYSTEM AND IMAGING APPARATUS

TECHNICAL FIELD

The present invention relates to a zoom lens system and to an imaging apparatus equipped with the same.

BACKGROUND ART

Japanese Laid-open Patent Publication No. 2016-14807 discloses an optical system that is small, has favorable performance across the entire zoom range and the entire focusing range, and is also ideally suited to image pickup of video. This publication discloses that zooming from the wide-angle end to the telephoto end is performed by moving second, third, and fourth groups together toward the object side so that the distance between the negative first group and the positive second group decreases, the distance between the second group and the negative third group increases, and the distance between the third group and the positive fourth group decreases. The third group is composed of a negative group 3A and a negative group 3B, one out of the group 3A and the group 3B is composed of a single negative lens and the other is composed of a negative lens and a positive lens, and only the lens group composed of a single negative lens is moved in a direction that is substantially perpendicular to the optical axis for image stabilization.

SUMMARY OF THE INVENTION

There is demand for a lens system that is easy to handle due to being more compact and lightweight, and is capable of acquiring images where aberrations are favorably corrected. There is also demand for an imaging pickup apparatus equipped with such a lens system.

One aspect of the present invention is a zoom lens system for image pickup. This zoom lens system is composed of, in order from the object side: a first lens group that has negative refractive power and moves toward the image plane side during zooming; a second lens group that has positive refractive power, includes an aperture stop, and moves toward the object side during zooming; and a third lens group that has positive refractive power and whose position of the third lens group is fixed with respect to an image plane. The second lens group includes a first sub-lens group, which is disposed on the object side, includes the aperture stop, and has positive refractive power, and a second sub-lens group, which is disposed on the image plane side, has negative refractive power, and moves independently of the first sub-lens group during focusing. When zooming from a wide-angle end to a telephoto end, the first lens group and the second lens group move so that a distance between the first lens group and the second lens group decreases and a distance between the second lens group and the third lens group increases. In one embodiment, the position of the first lens group at the telephoto end is located on the image plane side to the position at the wide-angle end, and the position of the second lens group at the telephoto end is located on the object side to the position at the wide-angle end.

This zoom lens system as a whole has a negative-positive-positive arrangement of refractive powers and makes it possible to provide a bright zoom lens system that is wide-angle with acquiring a sufficient amount of peripheral light. By fixing the position of the third lens group arranged on the image plane side, it is possible to simplify the mechanism used for zooming. In addition, a second sub-lens group for focusing is included in the second lens group and disposed on the image plane side of the second lens group that moves toward the object side during zooming (a change in magnification), which makes it possible to reduce the distance moved for focusing in keeping with a change in magnification and possible to dispose a mechanism for zooming, which moves the first lens group and the second lens group, on the object side and a mechanism for focusing, which moves only the lenses of the image plane side of the second lens group, on the image plane side. Accordingly, it is possible to prevent the zooming mechanism and the focusing mechanism from becoming complex, to simplify these mechanisms, and to provide the mechanisms in a dispersed arrangement, which makes it possible to provide a zoom lens system that is compact, lightweight, and easy to handle. In addition, since it is possible to dispose the focusing mechanism close to hand on the image plane side, it is possible to provide a zoom lens system that is easy to operate.

By providing the second sub-lens group that performs focusing with negative refractive power, the zoom lens system as a whole has a negative-positive-negative-positive arrangement of refractive powers, which makes it easy to favorably correct aberrations. The second sub-lens group may include a first lens unit with positive refractive power and a second lens unit with negative refractive power, and a focal length fLP of the first lens unit and a focal length fLN of the second lens unit may satisfy a following Condition (1).

$$0.25<|fLN/fLP|<0.50 \qquad (1)$$

By configuring the second sub-lens group that performs focusing of two lens units with different refractive powers, it is possible to favorably correct aberrations in addition to focusing. When the upper limit of Condition (1) is exceeded, the negative refractive power is too low and the correction of aberrations is insufficient, resulting in deterioration in curvature of field, spherical aberration, and axial chromatic aberration. On the other hand, when the lower limit of Condition (1) is exceeded, the negative refractive power is too high and the correction of aberrations is excessive, resulting in deterioration of curvature of field and spherical aberration.

The first lens unit may be composed of a single lens with positive refractive power and the second lens unit may be composed of two lenses with negative refractive power so that the first and second lens units construct the second sub-lens group which as a whole has negative refractive power. By increasing the number of lenses with negative refractive power, it is possible to increase the number of surfaces that contribute to aberration correction. As one example, the second lens unit may be constructed, from the object side, of a biconcave lens and a negative meniscus lens that is convex on the image plane side.

The focal length fS1 of the first sub-lens group and the focal length fS2 of the second sub-lens group may satisfy a following Condition (2).

$$0.5<|fS1/fS2|<1.5 \qquad (2)$$

When a focusing lens group is disposed on the image plane side of the aperture stop, the F number (F No.) will tend to fluctuate when the focus is moved. For this reason, in this zoom lens system, by setting the refractive power of the second sub-lens group that performs focusing and the refractive power of the first sub-lens group that includes the aperture stop in a range that is substantially equal, negative effects caused by focusing are suppressed. In addition, by setting the ratio of refractive powers of the first sub-lens group and the second sub-lens group in the range of Condition (2), it is possible to achieve favorable aberration correction performance. When the upper limit of Condition (2) is exceeded, the refractive power of the second sub-lens group that performs focusing is too high, resulting in a tendency for excessive correction and deterioration in performance for curvature of field and spherical aberration. When the lower limit of Condition (2) is exceeded, the refractive power of the second sub-lens group that performs focusing is too weak and aberration correction is insufficient, resulting in deterioration in performance for curvature of field, spherical aberration, and coma aberration. The upper limit of Condition (2) may be 1.3 and the lower limit may be 0.7.

The first sub-lens group may include a front group, which has positive refractive power and is disposed on the object side of the aperture stop, and a rear group, which has positive refractive power and is disposed on the image plane side of the aperture stop. In addition, the focal length fFS1 of the front group and the focal length fBS1 of the rear group may satisfy a following Condition (3).

$$1.0 < fFS1/fBS1 < 2.0 \quad (3)$$

By dispersing the first sub-lens group that has positive refractive power before and after the aperture stop, it is easy to correct aberration. Since the aperture stop moves during zooming, it is possible to provide a bright zoom lens system where the spreading of light flux is suppressed by disposing a front group with positive refractive power on the object side of the aperture stop. In addition, since it is possible to make the positive refractive power of the rear group positioned closer to the object side of the second sub-lens group that performs focusing stronger (the focal length is shorter) than the positive refractive power of the front group, it is easy to make the light flux that is incident on the second sub-lens group parallel to the optical axis and improve the focusing performance of the second sub-lens group.

The focal length fBS1 of the rear group and the focal length fS2 of the second sub-lens group may satisfy a following Condition (4).

$$1.0 < |fBS1/fS2| < 2.0 \quad (4)$$

When the lower limit of Condition (4) is exceeded (fallen below), the positive refractive power of the rear group is too strong and it becomes difficult to correct aberration during focusing. When the upper limit of Condition (4) is exceeded, the positive refractive power of the rear group is too weak, which tends to increase the diameter of the second sub-lens group that performs focusing.

In this zoom lens system, the first sub-lens group and the second sub-lens group may integrally move during zooming. Alternatively, the first sub-lens group and the second sub-lens group may move separately during zooming. The zoom lens system may further include a zoom mechanism that moves the first lens group and the second lens group during zooming and a focusing mechanism that moves the second sub-lens group during focusing.

Another aspect of the present invention is an imaging apparatus (image pickup device) including the zoom lens system described above and an image pickup element (an imaging element) disposed on the image plane side of the zoom lens system.

DESCRIPTION OF EMBODIMENTS

Figure 1:
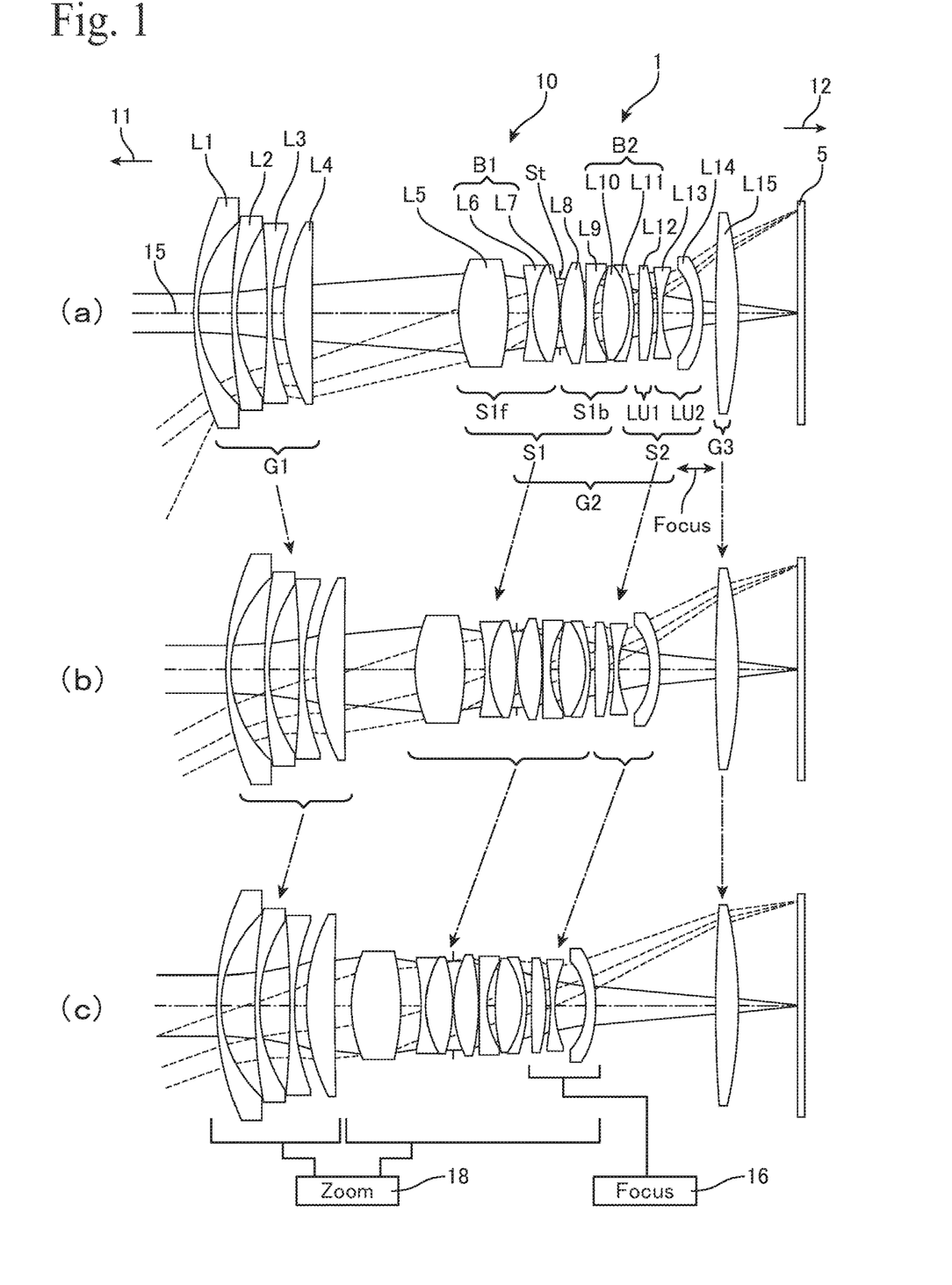
FIG. 1 is a diagram depicting the overall configuration of a zoom lens system and an imaging apparatus.

FIG. 1 depicts an example of an imaging apparatus (image pickup apparatus, camera or camera apparatus) equipped with an optical system for imaging (image pickup). FIG. 1(a) depicts the arrangement of lenses at the wide-angle end, FIG. 1(c) depicts the arrangement of lenses at the telephoto end, and FIG. 1(b) depicts the arrangement of lenses in an intermediate state. This camera 1 includes an optical system (image pickup optical system, imaging optical system or lens system) 10 and an image pickup element (imaging element, image pickup device or image plane) 5 disposed on the image plane side (image side, image pickup side or imaging forming side) 12 of the optical system 10. The optical system 10 is a zoom lens system 10 for image pickup and is composed of fifteen elements in three groups. In more detail, the lens system 10 is composed, in order from the object side (subject side) 11, of a first lens group G1 that has negative refractive power, a second lens group G2 that has positive refractive power and includes an aperture stop St, and a third lens group G3 that has positive refractive power. When zooming from the wide-angle end to the telephoto end, the first lens group G1 first moves toward the image plane side 12 and then moves toward the object side 11, the second lens group G2 integrally moves toward the object side 11, and the position of the third lens group G3 is fixed with respect to the image plane 5. The second lens group G2 includes a first sub-lens group S1, which is disposed on the object side 11, includes the aperture stop St, and has positive refractive power, and a second sub-lens group S2, which is disposed on the image plane side 12, moves independently of the first sub-lens group S1 during focusing, and has negative refractive power.

During zooming, the amount of movement of the second lens group G2 is larger than the amount of movement of the first lens group G1. Therefore, when the first lens group G1 has moved toward the object side 11, the distance between the first lens group G1 and the second lens group G2 decreases from the wide-angle end toward the telephoto end. Similarly, since the third lens group G3 is fixed, during zooming the distance between the second lens group G2 and the third lens group G3 increases from the wide-angle end toward the telephoto end. The position of the first lens group G1 at the telephoto end is closer to the image plane side 12 than the position at the wide-angle end (the position at the telephoto end is located on the image plane side 12 to the position as the wide-angle end), and the position of the second lens group G2 at the telephoto end is closer to the object side 11 than the position at the wide-angle end (the position at the telephoto end is located on the object side to the position of the wide angel end).

A high-performance zoom lens system 10 with high aberration-correcting performance typically has a large number of lens elements and a large aperture. This makes the lens system heavy and difficult to handle, and therefore makes it difficult to acquire stable images. In particular, lens systems for pickup of high-quality images are often constructed of ten to nearly twenty lens elements, which makes them unwieldy and difficult to handle. In addition, since the F number also fluctuates due to the aperture stop moving during zooming, it takes a lot of skill and experience for a cameraman to adjust focus and acquire images with little fluctuations in brightness while zooming.

The zoom lens system 10 includes a first lens group G1 that has negative refractive power, the second lens group G2 that has positive refractive power, and the third lens group G3 that has positive refractive power. As the overall configuration of refractive powers, this zoom lens system 10 is a "negative-lead" negative-positive-positive retrofocus-type zoom lens system 10. In addition, the second lens group G2 is composed of a combination of the first sub-lens group S1 that has positive refractive power and the second sub-lens group S2 that has negative refractive power and is used for focus adjustment, so that when these sub-lens groups are also considered, the zoom lens group 10 is negative-positive-negative-positive, that is, a combination of two retrofocus arrangements. This means that in spite of being wide-angle (that is, having a large angle of view), the lens system 10 as a whole can also achieve a relatively large zoom ratio without greatly increasing the lens diameter of the lens closest to the object side 11. In addition, this zoom lens system 10 makes it possible to provide a lens system that is composed of four groups with negative, positive, negative, and positive refractive powers, where the three groups with negative, positive, and negative refractive powers on the object side 11 move during zooming, the negative group on the image plane side 12 among the three groups moves during focusing, and the position of the positive group closest to the image plane side 12 is fixed during zooming and focusing.

In addition, during zooming (a change in magnification), after first moving toward the image plane side 12, the first lens group G1 is moved toward the object side 11 to compensate for fluctuations in aberrations and movement of the image due to movement of the second lens group G2 and to provide space for the second lens group G2 that moves toward the object side 11 during zooming. In addition, the second sub-lens group S2 for focusing is disposed on the image plane side 12 of the second lens group G2 that moves toward the object side 11 during zooming, and by moving this second sub-lens group S2 for focusing in conjunction with zooming operations, the amount of movement of the second sub-lens group S2 for focusing in keeping with changes in magnification is reduced.

During zooming, the position of the third lens group G3 closest to the image plane 12 is fixed, the first lens group G1 and the second lens group G2 on the object side 11 move, and focusing is additionally performed by the second sub-lens group S2 on the image plane side 12 of the second group G2. Accordingly, as depicted in FIG. 1(c), it is possible to separate the zooming mechanism 18 and the focusing mechanism 16, to dispose the zooming mechanism 18 on the object side 11, and to dispose the focusing mechanism 16 on the image plane side 12. This means that it is possible to simplify the zooming mechanism 18 and the focusing mechanism 16 and avoid complex configurations. As a result, it is possible to provide the zoom lens system 10 which as a whole is compact and lightweight, and is easy to handle. By fixing the third lens group G3 closest to the image plane side 12, the configuration at the image pickup device-side of the zoom lens system 10 is simplified, which makes it easy to connect the zoom lens system 10 and the image pickup device 5. In addition, since it is possible to dispose the focusing mechanism 16, which may need to be constantly operated during image pickup, on the image plane side 12 which is closest to the cameraman, it is possible to provide the zoom lens system 10 which is easy to focus.

In addition, the first sub-lens group S1 on the object side 11 of the second lens group G2 includes a front group S1f, which has positive refractive power and is disposed on the object side 11 of the aperture stop St, and a rear group S1b, which has positive refractive power and is disposed on the image plane side 12 of the aperture stop St. Accordingly, when taking into account the lens groups S1f and S1b disposed on both sides of the stop St, the zoom lens system 10 can be provided as a zoom lens system 10 composed of five groups in a negative-positive-positive-negative-positive arrangement, where the four groups on the object side 11 with a negative-positive-(stop)-positive-negative configuration that spans the stop St move during zooming, the negative group on the image plane side 12 moves during focusing, and the positive group closest to the image plane side 12 is fixed during zooming and focusing.

The second sub-lens group S2, which is the focusing group, includes, in order from the object side 11, a first lens unit LU1 that has positive refractive power and a second lens unit LU2 that has negative refractive power. As described above, the refractive powers of the respective groups and units are adjusted to satisfy Conditions (1) to (4) so that focusing and aberration correction can be favorably performed.

Figure 2:
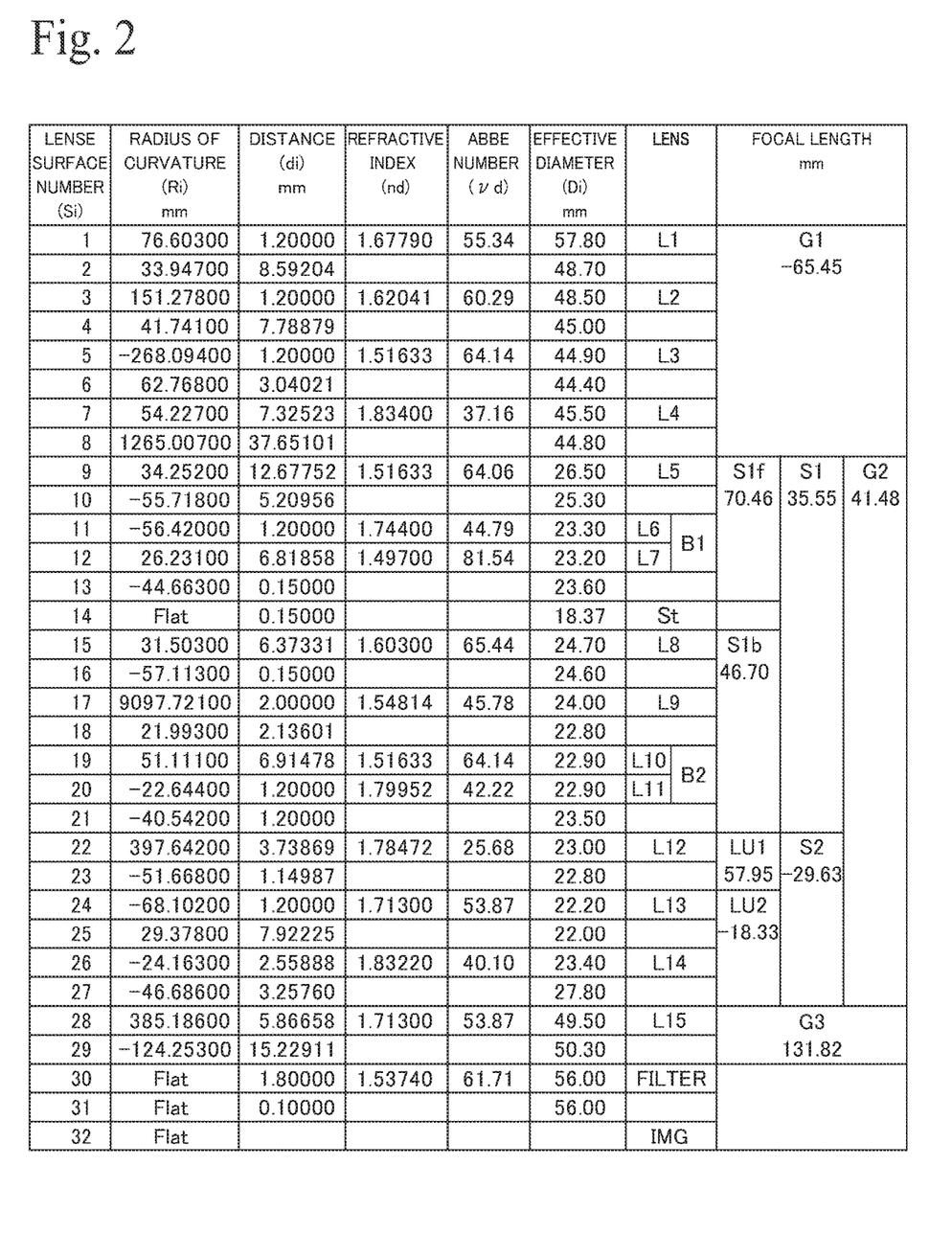
FIG. 2 is a diagram indicating lens data.

FIG. 2 shows data on the respective lenses that construct the lens system 10. The radius of curvature (Ri) is the radius of curvature (in mm) of each surface (S) of each lens disposed in order from the object side 11, the distance di is the distance (in mm) between the respective lens surfaces, the refractive index nd is the refractive index (d-line) of each lens, the Abbe number vd is the Abbe number (d-line) of each lens, and the effective diameter (Di) (in mm) is the effective diameter of each lens. Note that the final distance, in the present embodiment, the sum of d29 to d32 indicates the distance (back focus, BF) between the lens system 10 and the image pickup device 5. The same applies to the following embodiments. The focal lengths (combined focal lengths) of each group, each sub-lens group, and each lens unit are also shown in this figure.

Figure 3:
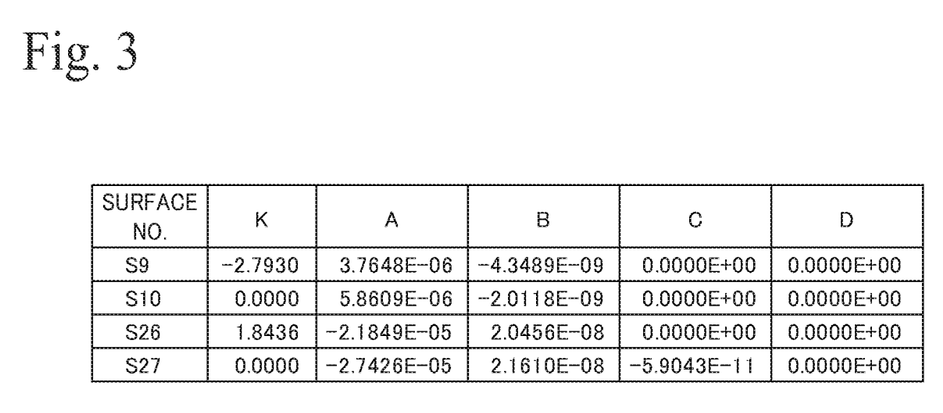
FIG. 3 is a diagram indicating aspherical coefficients.

FIG. 3 shows coefficients of aspherical surfaces included in the lens system 10. In this embodiment, the surface S9 on the object side 11 and the surface S10 on the image plane side 12 of the lens L5 that is closest to the object side 11 in the second lens group G2 and the surface S26 on the object side 11 and the surface S27 on the image plane side 12 of the lens L14 that is closest to the image plane side 12 in the second lens group G2 are aspherical. By making the surfaces of the lenses L5 and L14 at both ends of the second lens group G2, which makes a relatively large movement during zooming, and also both surfaces of the lens L14 included in the focusing group S2 aspherical, it is possible to stably and favorably correct aberrations across the entire focusing range and the entire zooming (magnification) range.

When X is the coordinate in the optical axis direction, Y is the coordinate in the direction perpendicular to the optical axis, the direction in which light propagates is positive, and R is the paraxial radius of curvature, each aspherical surface is expressed by the following equation (X) using the coefficients K, A, B, C, D, and E indicated in FIG. 3. The same also applies to the following embodiments. Note that "En" means "10 to the nth power".

$$X=(1/R)Y^2/[1+\{1-(1+K)(1/R)^2Y^2\}^{1/2}]+AY^4+BY^6+CY^8+DY^{10} \quad (X)$$

Figure 4:
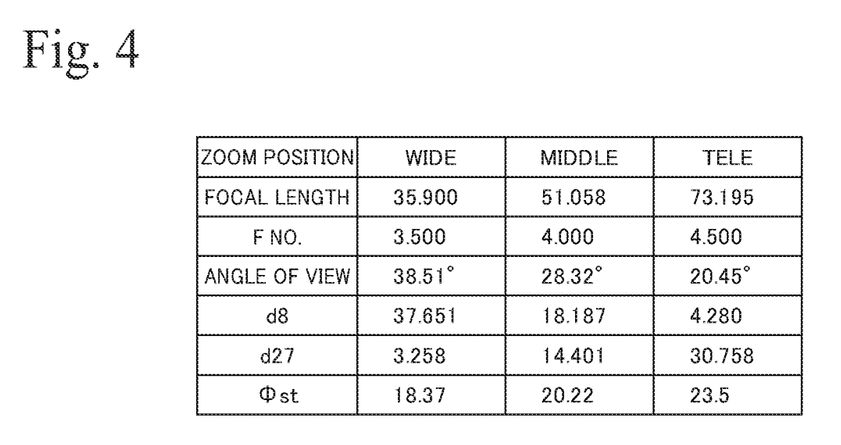
FIG. 4 is a diagram indicating numerical values that fluctuate during zooming.

FIG. 4 shows data of the lens system 10 at respective zoom positions, that is, the wide-angle end (WIDE), the telephoto end (TELE), and the middle (MIDDLE). FIG. 4 includes the combined focal length (in mm) of the zoom lens system 10, the F number (F No.), the angle of view, the distances between lens groups (d8 and d27, in mm), and the aperture diameter φst (or "diameter" in mm) of the aperture stop St. The aperture stop St also serves as the lens shutter, moves together with the second lens group G2 during zooming, and has an aperture diameter that changes to obtain sufficient brightness (F number) in a range where aberrations can be favorably corrected across the entire zoom range.

Figure 5:
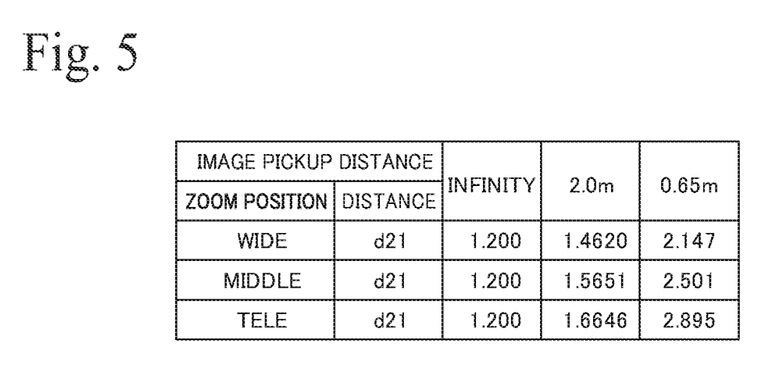
FIG. 5 is a diagram indicating numerical values that fluctuate during focusing.

FIG. 5 shows values of the distance d21 (in mm) between the focusing group S2 and the first sub-lens group S1 on the object side of the focusing group S2 at the wide-angle end (WIDE), the middle (MIDDLE), and the telephoto end (TELE) positions when the focal length (image pickup distance, imaging distance) is at infinity (INFINITY), at an intermediate position (2 m), and at the shortest position (or "nearest distance", 0.65 m).

Figure 6:
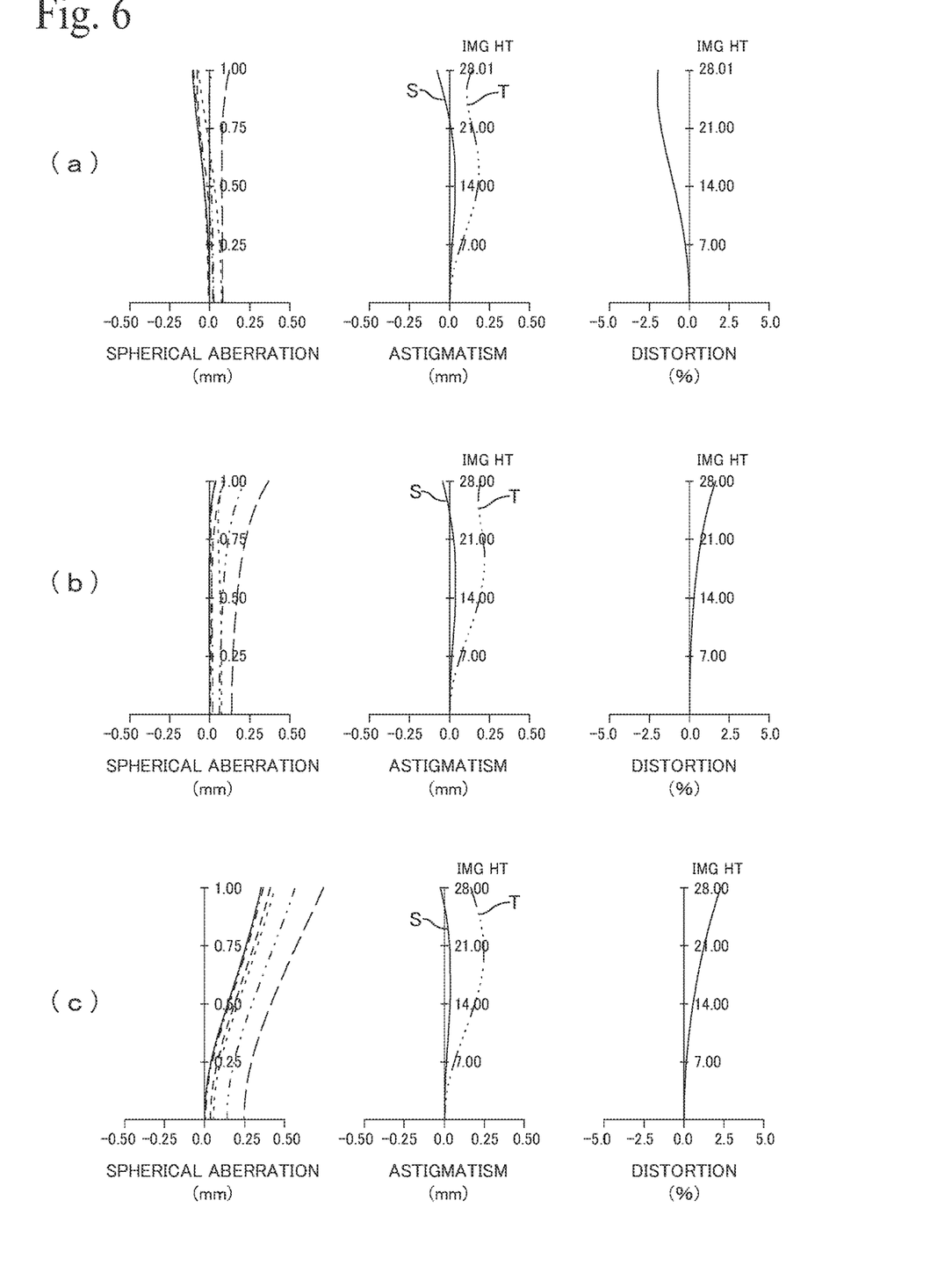
FIG. 6 is a diagram indicating various aberrations at the wide-angle end, the telephoto end, and an intermediate position.

FIG. 6 shows spherical aberrations, astigmatisms, and distortion of the lens system 10. Spherical aberrations are indicated for the wavelength 404.6600 nm (long dash line), the wavelength 435.8340 nm (dot-dot-dash line), the wavelength 486.1330 nm (medium dash line), the wavelength 546.0740 nm (solid line), the wavelength 587.5620 nm (dot-dash line) and the wavelength 656.2730 nm (short dash line). Astigmatisms are indicated for tangential rays T and sagittal rays S. The same applies to the aberration diagrams described later. FIG. 6(a) indicates aberrations at the wide-angle end with a focal length of infinity, FIG. 6(b) indicates aberrations at an intermediate position with a focal length of infinity, and FIG. 6(c) indicates aberrations at the telephoto end with a focal length of infinity.

In the lens system 10 depicted in these drawings, the first lens group G1, which has negative refractive power, is disposed closest to the object side 11 (disposed on the most of the object side 11), and moves, when zooming from the wide-angle end to the telephoto end first toward the image plane side 12 and then moves toward the object side 11. The first lens group G1 is composed of four lenses in a negative-negative-negative-positive arrangement of refractive powers including, in order from the object side 11, a meniscus lens L1 that has negative refractive power and is convex on the object side 11, a meniscus lens L2 that has negative refractive power and is convex on the object side 11, a biconcave negative lens L3, and a meniscus lens L4 that has positive refractive power and is convex on the object side 11. The zoom lens system 10 as a whole is retrofocus type and by using a negative meniscus lens L1 that is convex on the object side 11 as the lens L1 closest to the object side 11, it is possible to provide a lens system 10 that is suited to taking in peripheral light and is bright and wide-angle.

The second lens group G2 has positive refractive power as a whole, moves toward the object side 11 during zooming from the wide-angle end to the telephoto end, and includes, in order from the object side 11, a first sub-lens group S1, which has overall positive refractive power, and a second sub-lens group S2, which has overall negative refractive power. The first sub-lens group S1 is composed of the front group S1f and the rear group S1b that have positive refractive power and are disposed before and after the aperture stop St. The second sub-lens group S2 is a focus lens group and is composed of the first lens unit LU1 with positive refractive power and the second lens unit LU2 with negative refractive power.

The front group S1f has a three-lens configuration with a positive-negative-positive arrangement of refractive powers including, from the object side 11, a biconvex positive lens L5, a biconcave negative lens L6, and a biconvex positive lens L7. The negative lens L6 and the positive lens L7 construct a cemented lens B1 that has positive refractive power. The rear group S1b on the image plane side 12 on the opposite side of the aperture stop St has a four-lens configuration with a positive-negative-positive-negative arrangement of refractive powers including, from the object side 11, a biconvex positive lens L8, a negative meniscus lens L9 that is convex on the object side, a biconvex positive lens L10, and a negative meniscus lens L11 that is convex on the image plane side 12. The positive lens L10 and the negative meniscus lens L11 construct a cemented lens B2 that has positive refractive power.

Out of the lens units that construct the focus lens group S2, the first lens unit LU1 that has positive refractive power and is disposed on the object side 11 is a biconvex positive lens L12, that is, a single-lens configuration with positive refractive power, and the second lens unit LU2 that has negative refractive power and is disposed on the image side 12 has a two-lens configuration with a negative-negative arrangement of refractive powers including a biconcave negative lens L13 and a negative meniscus lens L14 that is convex on the image plane side 12.

The third lens group G3 that has positive refractive power and is fixed during zooming is a biconvex positive lens L15, that is, a single lens configuration with positive refractive power.

This lens system 10 is a zoom lens with a magnification ratio (zoom ratio) of 2.04, and is a wide-angle zoom lens system that is bright with an F number of around 4.0 and an angle of view of 38.5 degrees or wider at the wide-angle end. The respective focal lengths of the first lens group G1, the second lens group G2, and the third lens group G3, the focal length fS1 of the first sub-lens group S1 of the second lens group G2, the focal length fS2 of the second sub-lens group S2, the focal length fFS1 of the front group S1f of the first sub-lens group S1, the focal length fBS1 of the rear group S1b, the focal length fLP of the first lens unit LU1 of the second sub-lens group S2, and the focal length fLN of the second lens unit LU2 are as indicated in FIG. 2. Accordingly, the values of the various conditions described above of the lens system 10 are as follows.

| | |
|---|---|
| (\|fLN/fLP\|): 0.32 | Condition (1) |
| (\|fS1/fS2\|): 1.20 | Condition (2) |
| (fFS1/fBS1): 1.51 | Condition (3) |
| (\|fBS1/fS2\|): 1.58 | Condition (4) |

The zoom lens system 10 satisfies the respective Conditions (1) to (4). That is, the second sub-lens group S2 that performs focusing is composed of two lens units LU1 and LU2 with different refractive powers that satisfy Condition (1) and makes it possible to favorably correct aberrations during focusing. Although the first lens unit LU1 that has positive refractive power is constructed of a single lens as a minimum configuration, by constructing the second lens unit LU2 with negative refractive power that is set higher than the refractive power of the lens unit LU1 of two lenses and not the minimum configuration, the number of surfaces that contribute to correction of aberration is increased with a simple configuration, which achieves a sufficient aberration correction performance in addition to the focusing performance.

In particular, in the present embodiment, the first lens unit LU1 that has positive refractive power is disposed on the object side 11 that is near the aperture stop St, and the second lens unit LU2 on the image plane side 12 is constructed, from the object side 11, of the biconcave negative lens L13 and the negative meniscus lens L14 that is convex on the image plane side 12. Accordingly, by moving the positive and negative lenses L12 and L13, it is possible to adjust the focusing of light flux that has been collimated by the first sub-lens group S1 to become parallel to the optical axis 15. It is also possible to cause light flux that has been widened by negative-negative lenses, that is, the biconvex negative lens L13 and the negative meniscus lens L14 that is convex on the image plane side 12, to pass through the biconvex positive lens L15 that has a large area, which makes it possible to favorably correct aberrations at each image pickup distance. Additionally, in the zoom lens system 10 of the present embodiment, both surfaces of the negative meniscus lens L14 that is closest to the image plane side 12 in the sub-lens group S2 used for focusing have enlarged areas and are aspherical surfaces, which makes it possible to favorably correct aberrations at every zoom position and every image pickup distance.

In addition, in this lens system 10, the refractive power of the first sub-lens group S1 of the second lens group G2 positioned on the object side 11 of the second sub-lens group S2 for focusing is set so as to be substantially equal to the refractive power of the second sub-lens group S2 within a range that satisfies Condition (2). When the focusing lens group S2 is disposed on the image plane side 12 of the aperture stop St, the F number (F No.) will tend to fluctuate when the focus is moved. However, by setting the refractive power of the second sub-lens group S2 that performs focusing and the refractive power of the first sub-lens group S1 that includes the aperture stop so as to be substantially equal, fluctuations in the F number due to movement of the focusing group S2 are suppressed.

In addition, in this lens system 10, the first sub-lens group S1 of the second lens group G2 positioned on the object side 11 of the second sub-lens group S2 for focusing is divided into the front group S1f and the rear group S1b as groups before and after the aperture stop St, and the positive refractive power of the first sub-lens group S1 is dispersed so as to satisfy Condition (3). Dispersing the first sub-lens group S1 that has positive refractive power before and after the aperture stop St makes it easier to favorably correct aberrations. In this lens system 10, the aperture stop St moves during zooming. By disposing the front group S1f with positive refractive power on the object side 11 of the aperture stop St, it is possible to suppress the widening of light flux, which makes it possible to provide a bright zoom lens system 10 where the exclusion of peripheral light by the aperture stop St is suppressed. In addition, since the focal length (the positive refractive power) of the rear group S1b positioned closer to the object side 11 of the second sub-lens group S2 for focusing can be made smaller (stronger) than that of the front group S1f, out of the light flux incident on the second sub-lens group S2, it is possible to make the light rays incident on a circumference defined by the effective diameter on the object-side surface of the biconvex lens L12 (in the present embodiment, the upper light ray or lower light ray of off-axis light flux where the principal ray is incident at a position furthest from the optical axis) can be made substantially parallel to the optical axis 15. This means that the second sub-lens group S2 that moves during focusing can be miniaturized, which reduces the load of the focusing mechanism 16 and makes it possible to provide a compact zoom lens 10. Also, in the focusing group S2, since the incident light is parallel to the optical axis 15 and there is a tendency for the light emitted to the image plane side 12 to spread, it is possible to correct aberrations at lens surfaces whose contribution to aberration correction differs according to the distance moved along the optical axis 15 by the focusing group S2. This makes it possible to precisely correct aberrations over a wider range.

The refractive power of the rear group S1b of the first sub-lens group S1 is set slightly weaker than the refractive power of the second sub-lens group S2, which is the focusing group, so that Condition (4) is satisfied. By using this arrangement of refractive powers, it is possible to control how the light flux incident on the focusing group S2 spreads with even higher precision, and thereby possible to reduce the size of the focusing group S2 and improve the aberration correction performance.

In addition, as described above, in the zoom lens system 10, the zooming mechanism 18 and the focusing mechanism 16 can be separated and disposed along the optical axis 15. Accordingly, the mechanisms for moving lenses can be simplified, which makes it possible to provide a compact and lightweight lens system 10 that is easy to handle. Since the focusing mechanism 16 can be disposed close to hand, it is possible to provide a lens system 10 that is easy to hold and operate in the hand. By using an arrangement of refractive powers that satisfies the respective conditions as described above, it is possible to provide the zoom lens system 10 that is capable of acquiring images in which various aberrations have been favorably corrected across the entire zooming range, as indicated in FIG. 6.

Figure 7:
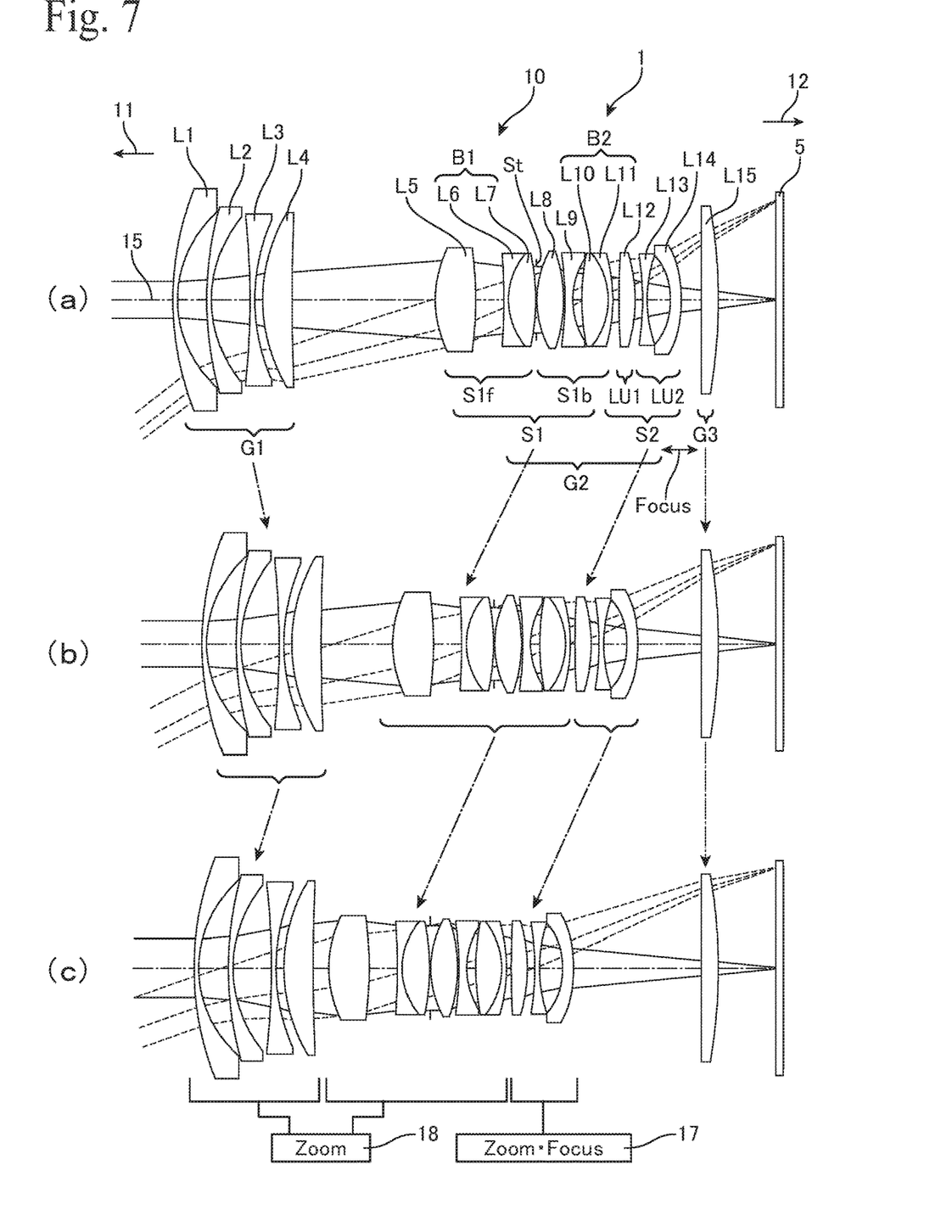
FIG. 7 is a diagram depicting the overall configuration of other examples of a zoom lens system and an imaging apparatus.

FIG. 7 depicts a different example of an imaging apparatus 1. This imaging apparatus (image pickup device, camera) 1 also includes a zoom lens system (image pickup optical system, imaging optical system or lens system) 10 and an image pickup element (imaging element, or image plane) 5 disposed on the image plane side (image side, image pickup side or image forming side) 12 of the lens system 10. FIG. 7 depicts lens arrangements in various states of the lens system 10 in the same way as in FIG. 1. FIG. 7(a) depicts the arrangement of lenses at the wide-angle end when the focus position is at infinity, FIG. 7(b) depicts the arrangement of lenses in an intermediate position between the wide-angle end and the telephoto end when the focus position is at infinity, and FIG. 7(c) depicts the arrangement of lenses at the telephoto end when the focus position is at infinity.

The basic configuration of this zoom lens system 10 is the same as the system described above. From the viewpoint of the direction of movement during zooming, the zoom lens system 10 consists of three groups including fifteen-element lens with a negative-positive-positive arrangement of refractive powers. When considering the focusing group S2, this zoom lens system 10 is also a lens system with a four-group, fifteen-element configuration with a negative-positive-negative-positive arrangement of refractive powers, while when considering the lens groups S1f and S1b before and after the stop St, the zoom lens system 10 is a lens system with a five-group configuration with a negative-positive-positive-negative-positive arrangement of refractive powers.

That is, the lens system 10 is composed, in order from the object side 11, of a first lens group G1 that has negative refractive power and moves when zooming from the wide-angle end to the telephoto end first toward the image plane side 12 and after that toward the object side 11, a second lens group G2 that has positive refractive power, includes the aperture stop St, and moves when zooming from the wide-angle end to the telephoto end toward the object side 11, and a third lens group G3 that has positive refractive power and whose position is fixed with respect to the image plane 5. The second lens group G2 includes the first sub-lens group S1, which is on the object side 11, includes the aperture stop St, and has positive refractive power, and a second sub-lens group S2, which is on the image plane side 12, has negative refractive power, and moves independently of the first sub-lens group S1 during focusing. The first sub-lens group S1 is composed of a front lens group S1f, which has positive refractive power and is disposed on the object side 11 of the aperture stop St, and a rear lens group S1b, which has positive refractive power and is disposed on the image plane side 12 of the aperture stop St. The second sub-lens group S2 is composed of a first lens unit LU1 that has positive refractive power and a second lens unit LU2 that has negative refractive power.

Accordingly, this lens system 10 has a configuration of four groups with a negative-positive-(stop)-positive-negative arrangement of refractive powers that is a symmetrical arrangement with the aperture stop St in between, zooming is performed by moving this configuration, and the negative group on the image plane side 12 moves to perform focusing. In addition, in this lens system 10, although the second sub-lens group S2, which is the focusing group, moves toward the object side 11 in the same manner as the first sub-lens group S1 when zooming from the wide-angle end to the telephoto end, the two sub-lens groups move separately and by different amounts. Accordingly, this lens system 10 may be provided with a zoom mechanism for cooperatively controlling the first lens group G1 and the second lens group G2 in the same way as the zoom lens system 10 depicted in FIG. 1, or as depicted in FIG. 7, the lens system 10 may be provided with a zooming mechanism 18 for cooperatively controlling the first lens group G1 and the first sub-lens group S1 and a mechanism 17 for controlling zooming and focusing of the second sub-lens group S2. In either case, the zooming mechanism 18 and the mechanism 17 including the focusing function can be divided and disposed on the object side 11 and the image plane side 12, which makes it possible to provide a compact, lightweight and easy-to-handle zoom lens system 10.

Figure 8:
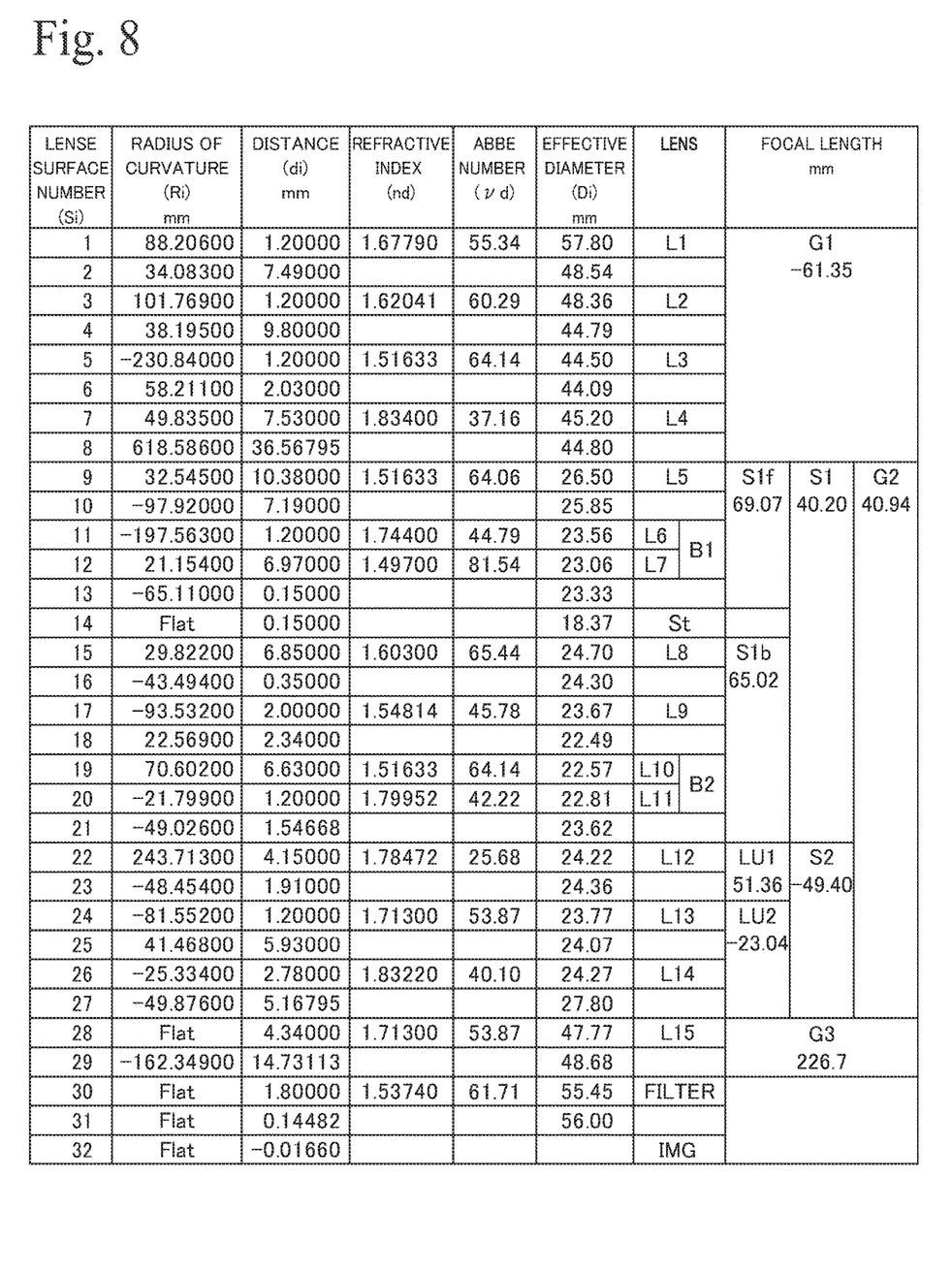
FIG. 8 is a diagram indicating lens data of the system depicted in FIG. 7.
Figure 9:
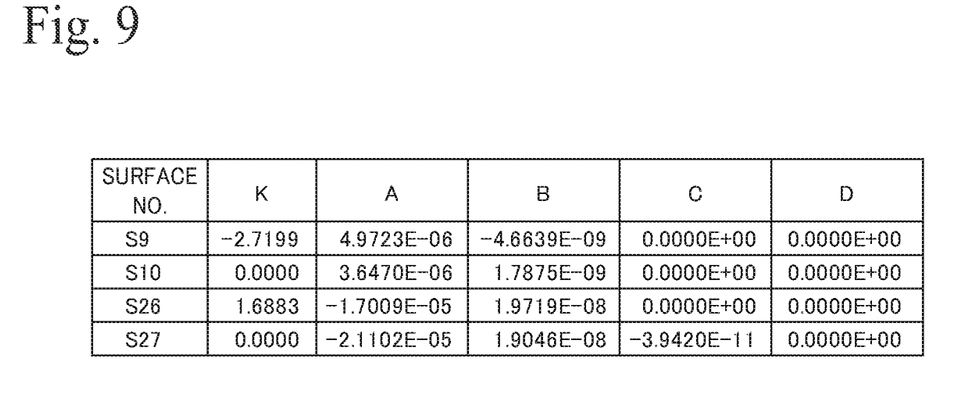
FIG. 9 is a diagram indicating aspherical coefficients of the system depicted in FIG. 7.
Figure 10:
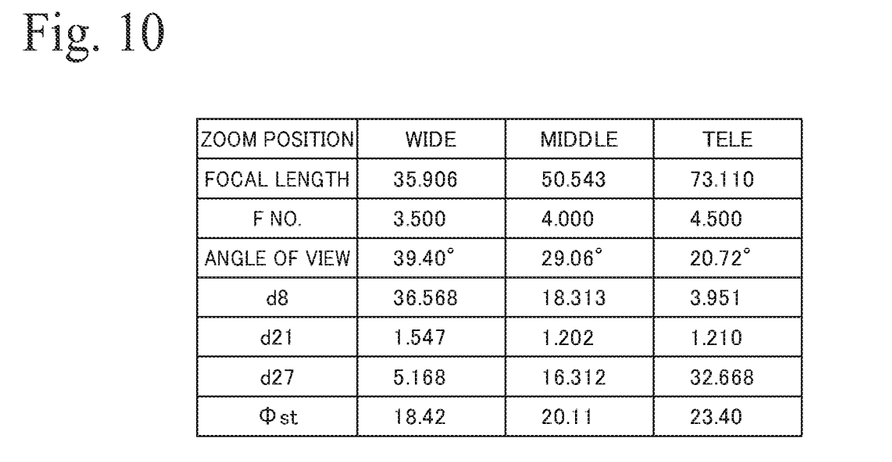
FIG. 10 is a diagram indicating numerical values that fluctuate during zooming of the system depicted in FIG. 7.
Figure 11:
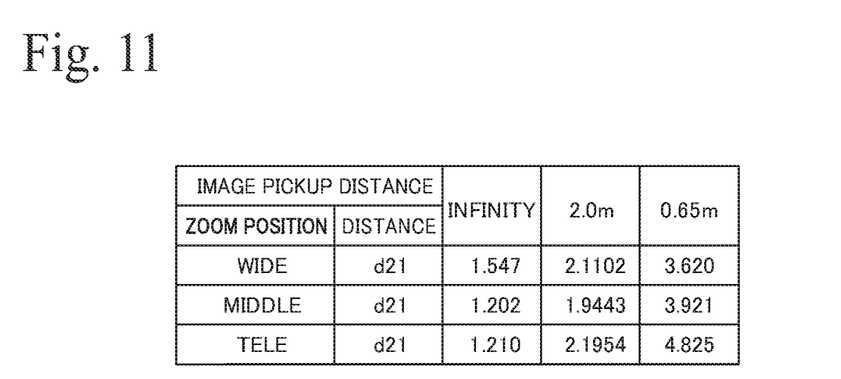
FIG. 11 is a diagram indicating numerical values that fluctuate during focusing of the system depicted in FIG. 7.

FIG. 8 shows data on the respective lenses that construct the lens system 10. FIG. 9 shows coefficients of the aspherical surfaces included in the lens system 10. In this example also, both surfaces S9 and S10 of the lens L5 closest to the object side 11 in the second lens group G2 and both surfaces S26 and S27 of the lens L14 closest to the image plane side 12 are aspherical. FIG. 10 indicates various numerical values at the wide-angle end, the telephoto end, and an intermediate position of the lens system 10. Although the respective numerical values are the same as those described based on FIG. 4, in this example, since the second sub-lens group S2 moves separately to the first sub-lens group S1 during zooming, the value of the variable distance d21 is also indicated. Like FIG. 5, FIG. 11 indicates the position of the second sub-lens group S2, which is the focusing group, for various image pickup distances as a variable distance d21.

Figure 12:
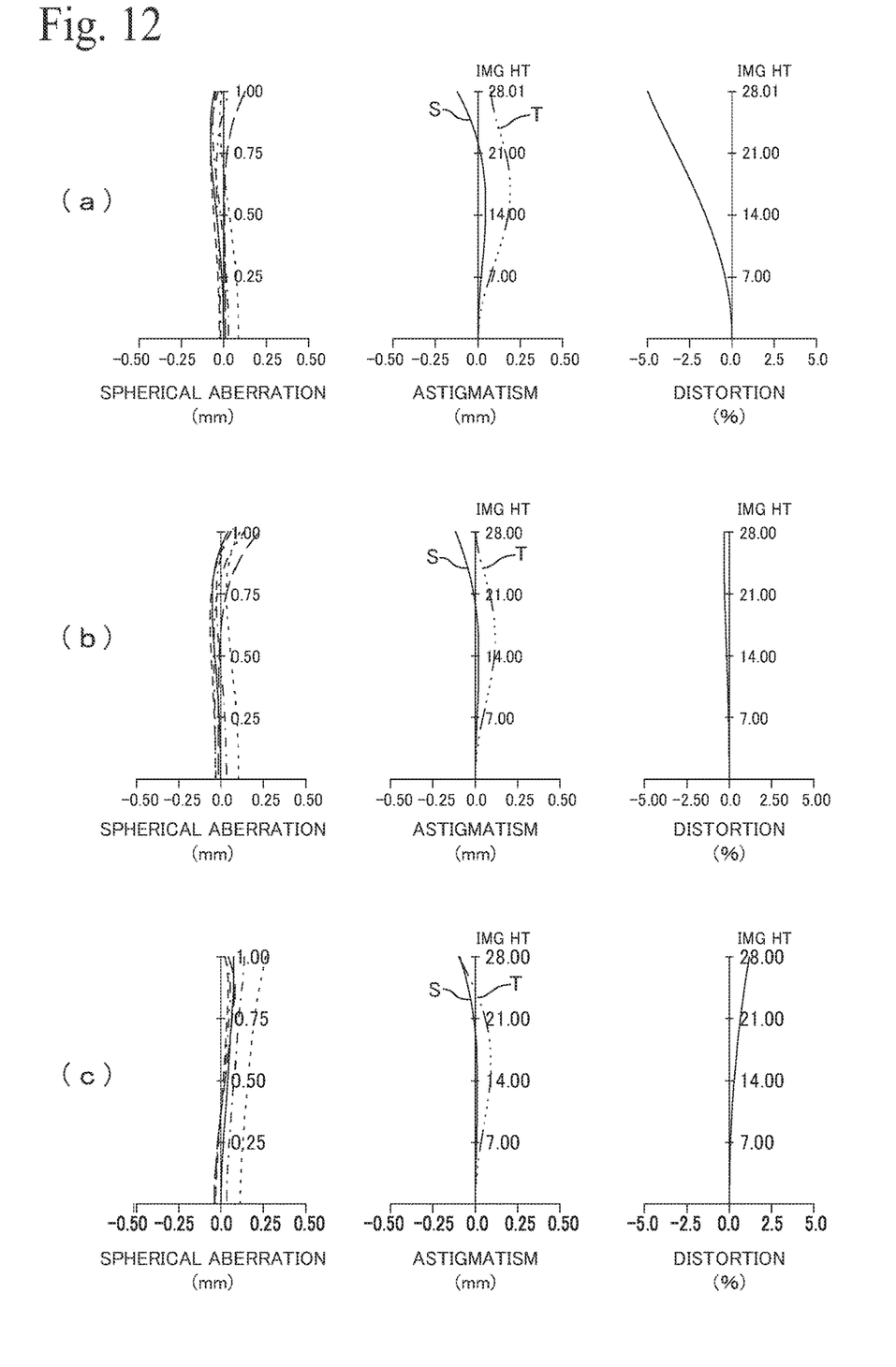
FIG. 12 is a diagram indicating various aberrations of the system depicted in FIG. 7 at the wide-angle end, the telephoto end, and an intermediate position.

FIG. 12 shows spherical aberration, astigmatism, and distortion of the lens system 10. FIG. 12 shows the aberrations at the wide-angle end (FIG. 12(a)), the intermediate position (FIG. 12(b)), and the telephoto end (FIG. 12(c)) when the focal length is at infinity.

Aside from the lens L9 being a biconcave negative lens, the basic configurations of the respective lens L1 to L14 of this lens system 10 are the same as in the lens system 10 depicted in FIG. 1. That is, the first lens group G1 is composed of four lenses in a negative-negative-negative-positive arrangement of refractive powers and includes, in order from the object side 11, a meniscus lens L1 with negative refractive power that is convex on the object side 11, a meniscus lens L2 with negative refractive power that is convex on the object side 11, a biconcave negative lens L3, and a meniscus lens L4 with positive refractive power that is convex on the object side 11.

The front group S1f of the first sub-lens group S1 in the second lens group G2 is composed of three lenses in a positive-negative-positive arrangement of refractive powers and includes, from the object side 11, a biconvex positive lens L5, a biconcave negative lens L6, and a biconvex positive lens L7. The negative lens L6 and the positive lens L7 construct a cemented lens B1. The rear group S1b on the image plane side 12 on the opposite side of the aperture stop St is composed of four lenses in a positive-negative-positive-negative arrangement of refractive powers and includes the biconvex positive lens L8, the biconcave negative lens L9, the biconvex positive lens L10 and a negative meniscus lens L11 that is convex on the image plane side 12. The positive lens L10 and the negative meniscus lens L11 construct a cemented lens B2. The first lens unit LU1 that has positive refractive power and constructs the object side 11 of the focus lens group S2 has a single-lens configuration with positive refractive power, or in other words is a biconvex positive lens L12. The second lens unit LU2 that has negative refractive power and constructs the image plane side 12 of the focus lens group S2 has a two-lens configuration with a negative-negative arrangement of refractive powers and includes a biconcave negative lens L13 and a negative meniscus lens L14 that is convex on the image side 12.

The third lens group G3 that has positive refractive power and the position thereof is fixed at the time of zooming has a single-lens configuration with positive refractive power, or in other words is a positive lens L15 that is flat on the object side 11.

This lens system 10 is also a zoom lens with a magnification ratio (zoom ratio) of 2.04, and is a wide-angle zoom lens system that is bright with an F number of around 4.0 with an angle of view of 39.4 degrees at the wide-angle end. The respective focal lengths of the first lens group G1, the second lens group G2, and the third lens group G3, and also the focal length fS1 of the first sub-lens group S1 and the focal length fS2 of the sub-lens group S2 of the second lens group G2, the focal length fFS1 of the front group S1f and the focal length fBS1 of the rear group S1b of the first sub-lens group S1, and the focal length fLP of the first lens unit LU1 and the focal length fLN of the second lens unit LU2 of the second sub-lens group S2 are as shown in FIG.

8. Accordingly, the values of the conditions described above of this lens system 10 are as follows.

| | |
|---|---|
| ($\|fLN/fLP\|$): 0.45 | Condition (1) |
| ($\|fS1/fS2\|$): 0.81 | Condition (2) |
| ($fFS1/fBS1$): 1.06 | Condition (3) |
| ($\|fBS1/fS2\|$): 1.32 | Condition (4) |

The lens system 10 depicted in FIG. 7 satisfies Conditions (1) to (4), is compact and can be made lightweight, and as indicated in FIG. 12, is a zoom lens system 10 that is capable of acquiring images in which various aberrations are favorably corrected across the entire zooming range.

The ability to dispose the zooming mechanism and the focusing mechanism in concentrated arrangements at the front and the rear, respectively, is the same as the lens system 10 in the embodiments described above, which makes it possible to provide a compact lens unit and an image pickup apparatus 1 that is lightweight and high performance.

The invention claimed is:

1. A zoom lens system for image pickup comprising, in order from the object side:
   a first lens group with negative refractive power that moves during zooming;
   a second lens group with positive refractive power that moves during zooming including an aperture stop; and
   a third lens group with positive refractive power, a position of that being fixed with respect to an image plane,
   wherein the first lens group and the second lens group move, when zooming from a wide-angle end to a telephoto end, so as to decrease a distance between the first lens group and the second lens group and increase a distance between the second lens group and the third lens group while the position of the third lens group is fixed,
   a position of the first lens group at the telephoto end is located on the image plane side to a position at the wide-angle end,
   a position of the second lens group at the telephoto end is located on the object side to a position at the wide-angle end, and
   the second lens group includes: a first sub-lens group with positive refractive power disposed on the object side including the aperture stop; and
   a second sub-lens group with negative refractive power disposed on the image plane side that moves independently of the first sub-lens group during focusing.

2. The zoom lens system according to claim 1, wherein a focal length fS1 of the first sub-lens group and a focal length fS2 of the second sub-lens group satisfy a following condition:

$0.5<|fS1/fS2|<1.5$.

3. The zoom lens system according to claim 1, wherein the first sub-lens group includes: a front group with positive refractive power disposed on the object side of the aperture stop; and a rear group with positive refractive power disposed on the image plane side of the aperture stop.

4. The zoom lens system according to claim 3, wherein a focal length fFS1 of the front group and a focal length fBS1 of the rear group satisfy a following condition:

$1.0<fFS1/fBS1<2.0$.

5. The zoom lens system according to claim 3, wherein the focal length fBS1 of the rear group and a focal length fS2 of the second sub-lens group satisfy a following condition:

$1.0<|fBS1/fS2|<2.0$.

6. The zoom lens system according to claim 1, wherein the first sub-lens group and the second sub-lens group integrally move during zooming.

7. The zoom lens system according to claim 1, further comprising:
   a zoom mechanism that moves the first lens group and the second lens group during zooming; and
   a focusing mechanism that moves the second sub-lens group during focusing.

8. An imaging apparatus comprising:
   a zoom lens system according to claim 1; and
   an image pickup element disposed on the image plane side of the zoom lens system.

9. A zoom lens system for image pickup comprising, in order from the object side:
   a first lens group with negative refractive power that moves during zooming;
   a second lens group with positive refractive power that moves during zooming including an aperture stop; and
   a third lens group with positive refractive power, a position of that being fixed with respect to an image plane,
   wherein the first lens group and the second lens group move, when zooming from a wide-angle end to a telephoto end, so as to decrease a distance between the first lens group and the second lens group and increase a distance between the second lens group and the third lens group while the position of the third lens group is fixed, and
   the second lens group includes: a first sub-lens group with positive refractive power disposed on the object side including the aperture stop; and
   a second sub-lens group with negative refractive power disposed on the image plane side that moves independently of the first sub-lens group during focusing, and
   the second sub-lens group includes a first lens unit with positive refractive power and a second lens unit with negative refractive power and a focal length fLP of the first lens unit and a focal length fLN of the second lens unit satisfy a following condition:

$0.25<|fLN/fLP|<0.50$.

10. The zoom lens system according to claim 9, wherein the first lens unit is composed of a single lens with positive refractive power, and
    the second lens unit is composed of two lenses with negative refractive power.

11. The zoom lens system according to claim 9, further comprising:
    a zoom mechanism that moves the first lens group and the second lens group during zooming; and
    a focusing mechanism that moves the second sub-lens group during focusing.

12. An imaging apparatus comprising:
    a zoom lens system according to claim 9; and
    an image pickup element disposed on the image plane side of the zoom lens system.

13. A zoom lens system for image pickup comprising, in order from the object side:
    a first lens group with negative refractive power that moves during zooming;
    a second lens group with positive refractive power that moves during zooming including an aperture stop; and a third lens group with positive refractive power, a position of that being fixed with respect to an image plane, wherein the first lens group and the second lens group move, when zooming from a wide-angle end to a telephoto end, so as to decrease a distance between the first lens group and the second lens group and increase a distance between the second lens group and the third lens group while the position of the third lens group is fixed, and the second lens group includes: a first sub-lens group with positive refractive power disposed on the object side including the aperture stop; and a second sub-lens group with negative refractive power disposed on the image plane side that moves independently of the first sub-lens group during focusing, and the first sub-lens group and the second sub-lens group move separately during zooming.

14. The zoom lens system according to claim 13, further comprising:

a zoom mechanism that moves the first lens group and the second lens group during zooming; and a focusing mechanism that moves the second sub-lens group during focusing.

15. An imaging apparatus comprising:

a zoom lens system according to claim 13; and an image pickup element disposed on the image plane side of the zoom lens system.

* * * * *